(12) United States Patent
Motomura et al.

(10) Patent No.: US 11,833,838 B2
(45) Date of Patent: Dec. 5, 2023

(54) INK JET RECORDING METHOD AND INK JET RECORDING APPARATUS

(71) Applicant: CANON KABUSHIKI KAISHA, Tokyo (JP)

(72) Inventors: Maki Motomura, Tokyo (JP); Tomohiro Yamashita, Kanagawa (JP); Takashi Saito, Kanagawa (JP); Arihiro Saito, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 17/379,136

(22) Filed: Jul. 19, 2021

(65) Prior Publication Data

US 2022/0024219 A1 Jan. 27, 2022

(30) Foreign Application Priority Data

Jul. 22, 2020 (JP) .................. 2020-125238
Jun. 22, 2021 (JP) .................. 2021-103218

(51) Int. Cl.
  *B41J 2/21* (2006.01)
  *B41M 5/00* (2006.01)
  (Continued)

(52) U.S. Cl.
  CPC ............. *B41J 2/2107* (2013.01); *B41J 2/175* (2013.01); *B41J 2/17509* (2013.01);
  (Continued)

(58) Field of Classification Search
  CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586;
  (Continued)

(56) References Cited

U.S. PATENT DOCUMENTS 7,160,372 B2   1/2007   Yoshizawa et al.
7,226,498 B2   6/2007   Yamashita et al.
(Continued)

FOREIGN PATENT DOCUMENTS

JP    2002-363462 A    12/2002
JP    2017-001391 A    1/2017
JP    2018-150518 A    9/2018

*Primary Examiner* — Manish S Shah
(74) *Attorney, Agent, or Firm* — Venable LLP

(57) ABSTRACT

Provided is an ink jet recording method capable of recording an image with a tertiary color, less causing color shift even with use of a recording apparatus having an ink inlet port. The ink jet recording method includes recording an image, with use of an ink jet recording apparatus that includes a plurality of aqueous inks; an ink storage portion that independently stores the aqueous inks; a recording head having formed therein an ejection orifice through which each aqueous ink is ejected; and a tube through which each aqueous ink is supplied from the ink storage portion to the recording head. The ink storage portion has provided thereto an inlet port through which the aqueous ink is filled, the tube is formed of a resin material, a cyan ink contains a phthalocyanine pigment, and both of a yellow ink and a magenta ink individually contain an azo pigment.

16 Claims, 3 Drawing Sheets

(51) Int. Cl.
  *B41J 2/175* (2006.01)
  *C09D 11/107* (2014.01)
  *C09D 11/322* (2014.01)
  *C09D 11/40* (2014.01)

(52) U.S. Cl.
  CPC ......... *B41M 5/0023* (2013.01); *C09D 11/107* (2013.01); *C09D 11/322* (2013.01); *C09D 11/40* (2013.01)

(58) Field of Classification Search
  CPC .. B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

(56) References Cited

U.S. PATENT DOCUMENTS

| | | | |
|---|---|---|---|
| 7,247,194 B2 | 7/2007 | Okamura et al. | |
| 7,270,701 B2 | 9/2007 | Jinnou et al. | |
| 7,297,197 B2 | 11/2007 | Jinnou et al. | |
| 7,550,037 B2 | 6/2009 | Mafune et al. | |
| 7,611,571 B2 | 11/2009 | Yamashita et al. | |
| 7,918,928 B2 | 4/2011 | Saito et al. | |
| 8,075,126 B2 | 12/2011 | Yoshizawa et al. | |
| 8,389,600 B2 | 3/2013 | Suzuki et al. | |
| 8,469,504 B2 | 6/2013 | Saito et al. | |
| 8,616,695 B2 | 12/2013 | Mori et al. | |
| 8,857,967 B2 | 10/2014 | Saito et al. | |
| 8,871,013 B2 | 10/2014 | Sakai et al. | |
| 8,932,394 B2 | 1/2015 | Kudo et al. | |
| 8,986,435 B2 | 3/2015 | Saito et al. | |
| 8,992,674 B2 | 3/2015 | Ikegami et al. | |
| 8,998,397 B2 | 4/2015 | Mori et al. | |
| 9,371,461 B2 | 6/2016 | Saito et al. | |
| 9,453,138 B2 | 9/2016 | Shimizu et al. | |
| 9,562,165 B2 | 2/2017 | Mori et al. | |
| 9,895,901 B2 | 2/2018 | Saito et al. | |
| 9,994,012 B2 | 6/2018 | Negishi et al. | |
| 10,240,053 B2 | 3/2019 | Nushiro et al. | |
| 10,280,326 B2 | 5/2019 | Saito et al. | |
| 10,479,082 B2 | 11/2019 | Nakagawa et al. | |
| 10,562,305 B2 | 2/2020 | Saito et al. | |
| 10,563,076 B2 | 2/2020 | Saito et al. | |
| 2002/0196312 A1* | 12/2002 | Ishizawa | B41J 2/17566 347/50 |
| 2003/0218660 A1* | 11/2003 | Matsumoto | B41J 29/02 347/85 |
| 2006/0103705 A1 | 5/2006 | Yoshizawa et al. | |
| 2006/0264533 A1* | 11/2006 | Kataoka | B41M 5/0017 347/100 |
| 2007/0296787 A1* | 12/2007 | Masumi | B41J 2/17509 347/100 |
| 2008/0211884 A1* | 9/2008 | Saito | B41J 2/17509 347/85 |
| 2009/0058899 A1* | 3/2009 | Umeda | B41J 2/175 347/85 |
| 2010/0034972 A1 | 2/2010 | Mukae et al. | |
| 2010/0079566 A1* | 4/2010 | Ishikawa | B41J 2/17509 347/92 |
| 2011/0205293 A1* | 8/2011 | Kubo | B41J 29/377 347/30 |
| 2016/0280945 A1 | 9/2016 | Mukae et al. | |
| 2016/0355019 A1 | 12/2016 | Negishi et al. | |
| 2017/0120601 A1* | 5/2017 | Yamashita | B41J 2/21 |
| 2017/0120619 A1* | 5/2017 | Saito | B41J 2/19 |
| 2019/0039381 A1* | 2/2019 | Ishizawa | B41J 2/17506 |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus used therefor.

Description of the Related Art

In recent years, an ink jet recording method has been employed when printing business documents that contain text and chart on a recording medium such as plain paper. In addition, increase of telecommuters and SOHO populations has concurrently required that documents can be recorded at a higher speed with a compact device than before. With increased opportunities of use in such business scene, there is a strong market demand for increasing capacity of an ink storage portion, aiming at recording larger volume of documents. For example, Japanese Patent Application Laid-Open No. 2017-001391 proposes an ink jet recording apparatus having an ink storage portion capable of storing a large amount of ink.

An ink supplying unit in the recording apparatus equipped with such large-capacity ink storage portion is exemplified by a structure as below. That is, there is a known unit in which a recording head mounted on a carriage, and an ink storage portion installed elsewhere separately from the carriage are connected by an ink supply tube through which an ink is supplied from the ink storage portion to the recording head. By adopting such supplying unit, the capacity of the ink storage portion can be increased with a simple structure. Furthermore, provision of an inlet port to the ink storage portion enables replenishment of the ink through the inlet port to the ink storage portion, which is beneficial when using a larger amount of ink.

Furthermore, Japanese Patent Application Laid-Open No. 2017-001391 also describes that an aqueous ink containing a pigment has become widely used as a coloring material capable of recording a deep and clear image, aiming at expanded use of the ink jet recording method for business documents.

The present inventors have investigated a structure of an ink jet recording apparatus necessary for enhancing productivity, and an ink jet recording method using the same. Specifically, the inventors prepared an ink jet recording apparatus that includes an ink storage portion (main tank) provided with an inlet port, and a recording head provided with a sub tank, structured so that the main tank and the sub tank are connected by an ink supply tube. The inventors then used the ink jet recording apparatus to record images, with use of an ink set composed of pigment inks as proposed in Japanese Patent Application Laid-Open No. 2017-001391. The investigation consequently revealed a new problem that ejection of the individual color inks over a long period resulted in gradual color shift found in tertiary color images.

It is, therefore, an object of the present invention to provide an ink jet recording method capable of recording an image with tertiary color, less causing color shift even with use of a recording apparatus having a large-capacity ink storage portion provided with an inlet port. It is another object of the present invention to provide an ink jet recording apparatus applicable to the ink jet recording method.

SUMMARY OF THE INVENTION

The above object is achieved by the following invention. That is, according to the present invention, there is provided an ink jet recording method with use of an ink jet recording apparatus that includes a plurality of aqueous inks including a cyan ink, a magenta ink and a yellow ink; an ink storage portion that independently stores the aqueous inks; a recording head having formed therein an ejection orifice through which each aqueous ink supplied from the ink storage portion is ejected; and a tube through which each aqueous ink is supplied from the ink storage portion to the recording head, and the method including applying each aqueous ink ejected through the ejection orifice onto a recording medium to record an image, the ink storage portion having provided thereto an inlet port through which each aqueous ink is filled, the tube being formed of a resin material, the cyan ink containing a phthalocyanine pigment, and both of the yellow ink and the magenta ink individually containing an azo pigment.

According to the present invention, it now becomes possible to provide an ink jet recording method capable of recording an image with a tertiary color, less causing color shift even with use of a recording apparatus having a large-capacity ink storage portion provided with an inlet port.

Further features of the present invention will become apparent from the following description of exemplary embodiments with reference to the attached drawings.

DESCRIPTION OF THE EMBODIMENTS

Figure 1:
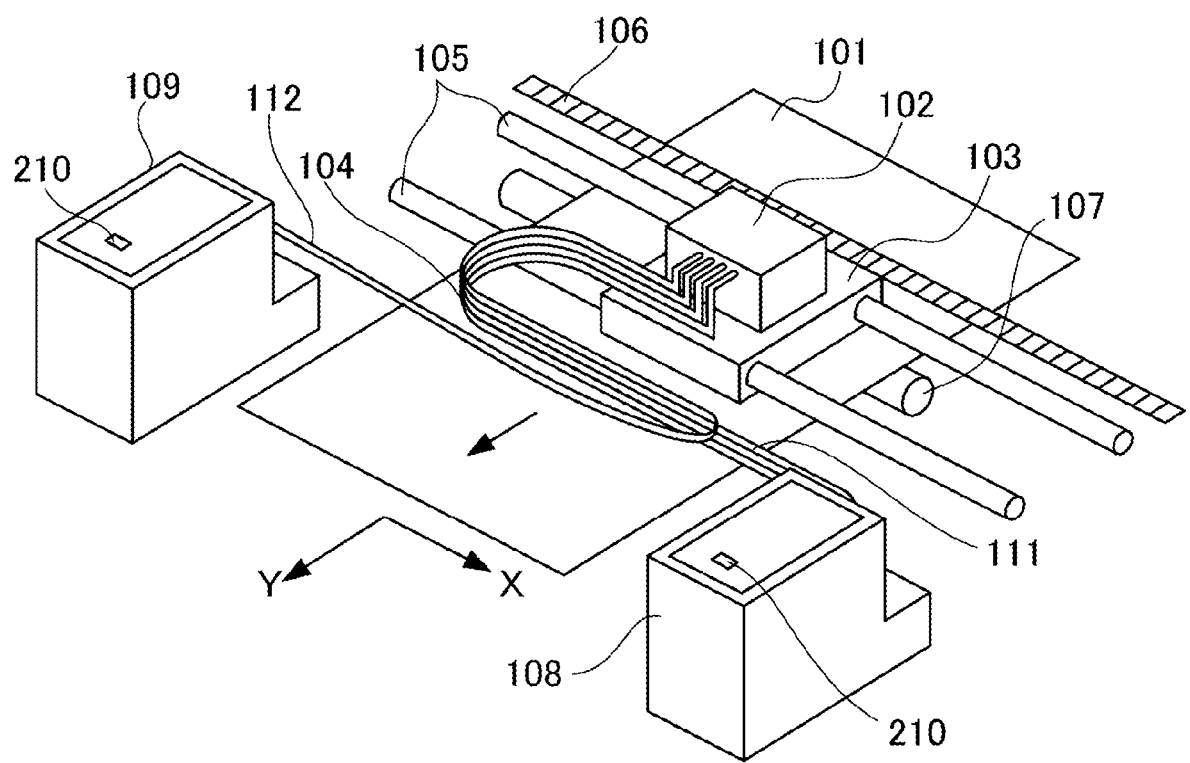
FIG. 1 is a perspective view schematically illustrating one embodiment of an ink jet recording apparatus of the present invention.

The present invention will further be detailed, referring to preferred embodiments. In the present invention, in a case where some compound is a salt, the ink will be denoted to "contain a salt" for convenience, even if the compound is ionized in the ink. The aqueous ink for ink jet use may be occasionally and simply referred to as "ink". Physical values are those observed at normal temperature (25° C.) unless otherwise specifically noted.

The present inventors first prepared an ink jet recording apparatus having a main tank, which is a large-capacity ink storage portion provided with an inlet port, and observed any changes inside the ink jet recording apparatus when used for recording images over a long period. As a consequence, a pigment was found to aggregate on the inner surface of the tube (ink supply tube) through which the ink is supplied from the main tank to the recording head, or to clog within the tube over the long period of use. Further closer observation revealed that the degree of such event varied depending on the color of inks. Specifically, the pigment was found to tightly adhere on the inner surface of the tube that corresponds to a magenta ink, demonstrating gradual narrowing of the inner diameter of the tube that corresponds to a magenta ink, as compared with the inner diameters of the tubes that correspond to a cyan ink and a yellow ink.

In the early stage of use of the recording apparatus, the pigments were found to neither adhere nor aggregate in the tubes that individually correspond to the three colors of ink. However, the ink becomes more likely to condense or the pigment becomes more likely to aggregate, in the recording apparatus having the main tank provided with the inlet port, since a liquid component in the main tank is more likely to evaporate, due to open/close operation of the inlet port, and prolonged retention time of the ink. Furthermore, pigment inks are more likely to interact with thermoplastic resin, which is a typical material for composing resin tubes, as compared with dye inks, and more likely to cause adhesion of pigments on the inner surface of the tubes. Hence, prolonged use of the recording apparatus, having the large-capacity main tank equipped with the inlet port, will consequently repeat a cycle of flow and stagnation of the ink or aggregates of the pigments inside the tubes.

In particular, quinacridone pigment which is a popular coloring material for the magenta ink is considerably easier to aggregate. Hence, prolonged use of the recording apparatus will be more likely to narrow the inner diameter of the tube that corresponds to the magenta ink, due to adhesion of aggregated pigment on the inner surface of the tube. In contrast, phthalocyanine pigment which is a popular coloring material for the cyan ink, and an azo pigment which is a popular coloring material for the yellow ink are considerably hard to aggregate as compared with the quinacridone pigment. For this reason, the flow rate and the speed of the ink that flows in the tube corresponding to the magenta ink are likely to significantly decrease during the long-term use of the recording apparatus as compared with the flow rate and the speed of the ink that flows in the tube corresponding to each of the cyan ink and the yellow ink. Hence, the ejection volume of the magenta ink during image recording is considered to gradually decrease as compared with the cyan ink and the yellow ink, thus causing "color shift" which means green shift of color tone of the tertiary color.

Such high aggregation tendency of the quinacridone pigment is attributable to its planar structure. In addition, due to hydrophobicity of the surface of the planar structure, the pigment is more likely to interact with the inner surface of the tube, resulting in chain adhesion. The inner diameter of the tube that corresponds to the magenta ink containing the quinacridone pigment is thus considered to be specifically narrowed. Nonetheless, use of the quinacridone pigment is preferred in order to express a color tone well recognizable as magenta. The present inventors then investigated into a method of recording images with high productivity, while expressing a magenta color tone as before, but suppressing color shift of the tertiary color. The present inventors finally conceived to use an azo pigment for the magenta ink, and arrived at the present invention.

Pigments such as quinacridone and quinacridone solid solution, which are pigments widely used for magenta ink, and diketopyrrolopyrrole and dioxazine, which are pigments often used for magenta ink, are likely to aggregate by their natures. Quinacridone skeleton, diketopyrrolopyrrole skeleton and dioxazine skeleton are highly flat in the portions thereof where a plurality of rings including aromatic ring are condensed, providing large areas that take part in attraction among the planes. In addition, with imino group and carbonyl group contained therein, the molecules are more likely to form strong hydrogen bonds among them. Furthermore, since the pigments can have large contact area with the inner surface of the tube due to the highly flat portions, so that the pigments can successively adhere to the inner surface of the tube, over a long period of flow and stagnation of the ink.

In contrast, the azo pigment with a sterically rotatable structure (azo bond) allows the molecule to freely rotate around the azo bond assumed as the axis of rotation. That is, the azo pigment is less planar, and is therefore less likely to cause stacking among the molecules, so that the pigment is less likely to aggregate. Hence, the pigment is less likely to adhere on the inner surface of the tube even after prolonged use, the inner diameter of the tube will therefore less likely to be narrowed, making it possible to keep the flow volumes and flow rates in the tubes for the cyan ink, yellow ink and magenta ink at equivalent levels. In this way, it now becomes possible to record images with a tertiary color and with less color shift, even with use of a recording apparatus having the large-capacity ink storage portion provided with the inlet port.

<Ink Jet Recording Method and Ink Jet Recording Apparatus>

The ink jet recording method of the present invention uses an ink jet recording apparatus that includes a plurality of aqueous inks, an ink storage portion, a recording head having formed therein an ejection orifice through which the aqueous ink is ejected, and a tube. The plurality of aqueous inks include a cyan ink, a magenta ink and a yellow ink. The ink storage portion is a member that independently stores the aqueous inks, which is provided with an inlet port through which each aqueous ink is filled. The recording head has formed therein an ejection orifice through which each aqueous ink supplied from the ink storage portion is ejected. The tube is a member, formed of a resin material, that connects the recording head and the ink storage portion, through which the aqueous ink is supplied from the ink storage portion to the recording head. The ink jet recording method of the present invention includes applying the aqueous ink ejected through the ejection orifice of the recording head onto a recording medium to record an image. Furthermore, the ink jet recording apparatus of the present invention includes a plurality of aqueous inks, an ink storage portion, a recording head having formed therein an ejection orifice through which the aqueous ink is ejected, and a tube. The ink storage portion of the ink jet recording apparatus is provided with the inlet port through which each aqueous ink is filled, and the tube is formed of a resin material.

<Ink Jet Recording Apparatus>

FIG. 1 is a perspective view schematically illustrating one embodiment of the ink jet recording apparatus of the present invention. The ink jet recording apparatus of this embodiment is a so-called serial type ink jet recording apparatus that performs recording operation on the basis of reciprocatingly scanning motion of the recording head in the X-direction (main scanning direction). A recording medium 101 is intermittently conveyed in the Y-direction (sub-scanning direction) by a conveying roller 107. The recording unit 102 mounted on a carriage 103 is reciprocated for scanning in the X-direction (main scanning direction) which is orthogonal to the Y-direction in which the recording medium 101 is conveyed. The recording operation is enabled by conveyance of the recording medium 101 in the Y-direction, and by reciprocatingly scanning motion of the recording unit 102 in the X-direction. The recording unit 102 includes an ink jet type recording head 203 (FIG. 2) that ejects the supplied ink through a plurality of ejection orifices and a sub tank 202 (FIG. 2) as a second ink storage portion, and is mounted on the carriage 103. The carriage 103 is movably supported by a guide rail 105 arranged in the X-direction, and is fixed to an endless belt 106 that moves in parallel with the guide rail 105. The endless belt 106 reciprocates making use of driving force of a motor, whereby the carriage 103 is reciprocated for scanning in the X-direction.

A main tank 201 (FIG. 2) as a first ink storage portion is housed in each of main tank housings 108 and 109. The main tank 201 housed in each of the main tank housings 108 and 109, and the sub tank 202 of the recording unit 102 are connected by an ink supply tube 104. The ink is supplied from the main tank 201 through the ink supply tube 104 to the sub tank 202 (FIG. 2), and is then ejected through the ejection orifice of the recording head 203. All of the main tank 201, the ink supply tube 104 and the sub tank 202 may be multiplied by the number of kinds of ink. The main tank in the main tank housing 108 and the sub tank composing the recording unit 102 are connected by a color ink tube 111. The main tank in the main tank housing 109 and the sub tank composing the recording unit 102 are connected by a black ink tube 112. The main tank 201 and the sub tank 202 are preferably connected by the ink supply tube 104 without interposing any other ink storage portion in between.

Each of the main tank housings 108 and 109 is provided with an ink inlet port 210 through which the ink is filled from the outside of the ink jet recording apparatus into the main tank 201. The ink is filled from an ink bottle into the main tank arranged inside the ink jet recording apparatus, typically when the ink jet recording apparatus is used for the first time, and when remaining amount of ink decreased. The user can open the ink inlet port 210, and can fill the ink into the ink tank 201. That is, the main tank is installed inside the ink jet recording apparatus, and is not replaced per se.

Figure 2:
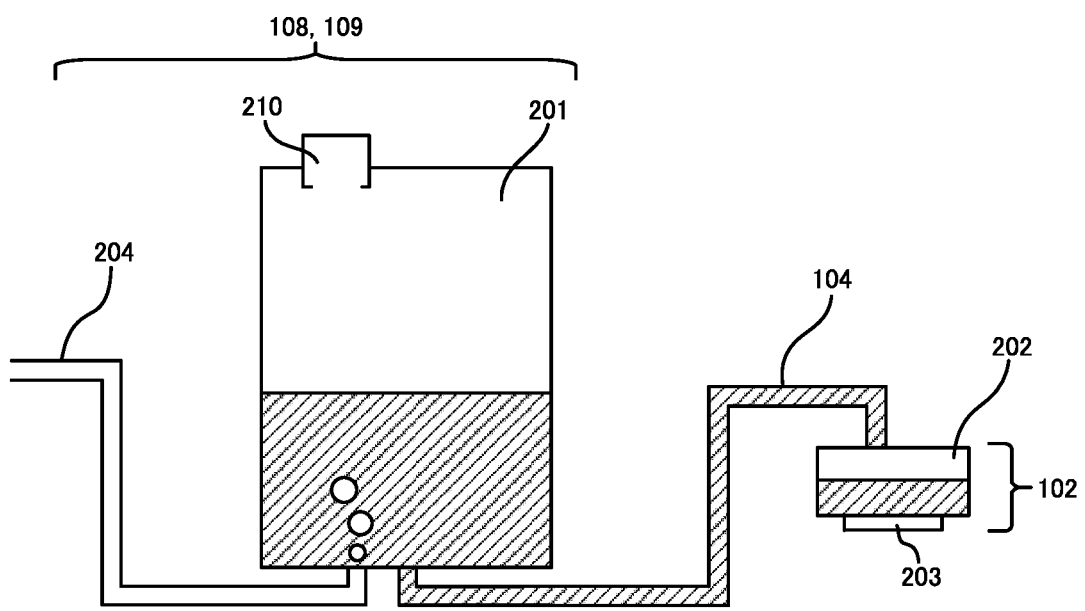
FIG. 2 is a schematic drawing schematically illustrating an example of an ink supplying system.

FIG. 2 is a schematic drawing schematically illustrating an example of an ink supplying system. The ink (indicated by hatching) stored in the main tank 201 is supplied through the ink supply tube 104 to the sub tank 202, and then supplied to the recording head 203. The main tank 201 has connected thereto a gas introduction tube 204 as an air vent part. Upon completion of recording and consumption of the ink, the ink is supplied from the main tank 201 to the sub tank 202, and the ink in the main tank 201 decreases. Then, the air is introduced through the gas introduction tube 204, having one end opened to the atmosphere, into the main tank 201, whereby the internal negative pressure for retaining the ink is kept nearly constant in the ink supplying system.

The ink supply tube 104 that includes the color ink tube 111 and the black ink tube 112 is connected to the sub tank 202 that composes the recording unit 102 mounted on the carriage 103. Thus, the ink supply tube 104 is dragged inside the device, following the carriage 103 in reciprocatingly scanning operation. Hence a material used for composing the ink supply tube 104 is necessarily selected from among those flexible enough to endure frequent reciprocation for scanning of the carriage 103. The ink supply tube 104 is therefore formed of a resin material.

The ink supply tube is a member formed by molding a resin material into a tubular shape. The resin material composing the tube may be a single resin material or a combination of two or more resin materials. The resin material may be even any of those having various additives contained therein. The tube may have a single layer structure or a laminated structure. The resin material is preferably a thermoplastic elastomer for its excellent moldability, rubber elasticity and flexibility. The thermoplastic elastomer is exemplified by olefin-based, urethane-based, ester-based, styrene-based and vinyl chloride-based resins. Among them, styrene-based thermoplastic elastomer is preferred since it particularly excels in flexibility and rubber elasticity. Additives to be blended in the resin material are exemplified by softener, lubricant, surfactant, antioxidant, anti-aging agent, adhesion promoter and pigment.

The inner diameter and thickness of the tube are properly determined, considering productivity of molding and so forth, flexural rigidity demonstrated when dragged within the recording apparatus, feed stability of ink, gas barrier performance and so forth. The inner diameter of the tube is preferably 1 mm or more to 5 mm or less, and more preferably 1 mm or more to 3 mm or less. The thickness of the tube is preferably 0.5 mm or more to 5 mm or less, and more preferably 0.5 mm or more to 3 mm or less.

The ink supply tube, with low gas barrier performance or high air permeability, will be likely to allow a liquid component such as water to evaporate therethrough. Evaporation of the liquid component tends to weaken an action such as electrostatic repulsive force for dispersing the pigment, whereby the pigment would have destabilized state of dispersion, would aggregate and become more likely to adhere on the inner surface of tube, possibly degrading the degree of suppressing tone change of the tertiary color. The volume of air permeation through the tube is therefore preferably 60 µL/day or less. On the other hand, the tube with low gas barrier property, although enjoying high rigidity, is preferably flexible enough to endure dragging within the recording apparatus. The volume of air permeation through the tube is therefore preferably 10 µL/day or more.

Figure 3:
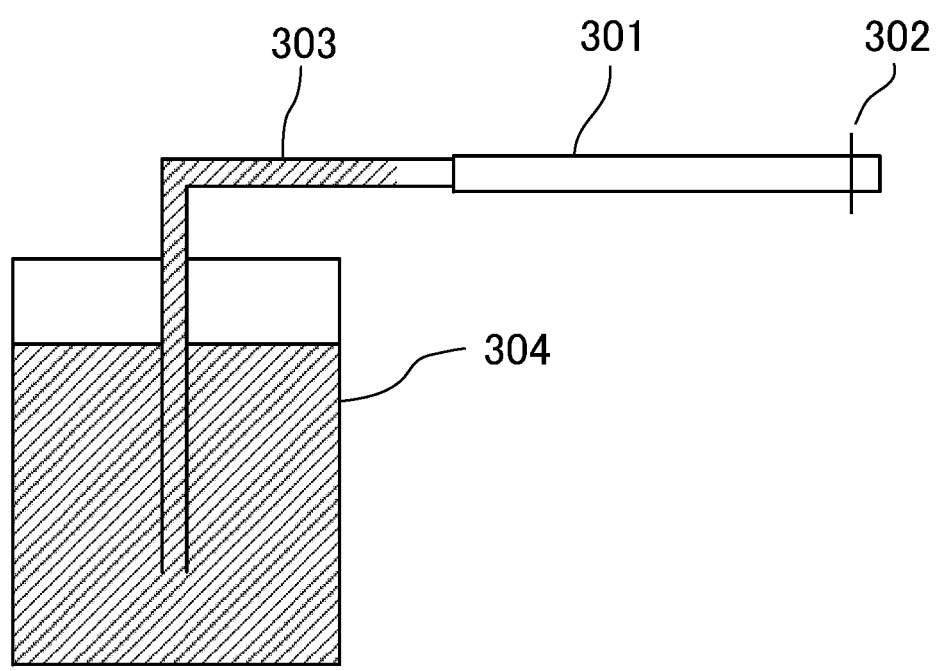
FIG. 3 is a schematic drawing for explaining a method of measuring a volume of air permeation through a tube.

The volume of air permeation through the tube can be measured according to the following method. FIG. 3 is a schematic drawing for explaining a method of measuring a volume of air permeation through the tube. As illustrated in FIG. 3, one end of a tube 301 cut in an arbitrary length is closed with a pinch cock 302, and the other end is connected to one end of an L-shaped 1 mL measuring pipette 303. The other end of the measuring pipette 303 is immersed in water filled in a container 304. The tube thus arranged is allowed to stand in an environment at 40° C. with 20% relative humidity, and scale of the measuring pipette is read at certain intervals of time to measure the incoming volume of air permeation through the tube. The volume of air permeation through the tube in the present invention means the volume per 100 mm length of the tube, expressed in "µL/day". The reason why the volume of air permeation through the tube is specified at 40° C. is that the evaluation is intended to confirm a sufficient effect in normal temperature environment (normal temperature or 25° C.), by carrying out the evaluation under a condition more severe than the normal temperature environment in which the ink jet recording apparatus is used.

The main tank 201 preferably has a large maximum volume of ink storage portion $V_1$ (mL), aiming at enhancing productivity by increasing the number of recordable sheets. Specifically, the maximum volume of ink storage portion $V_1$ (mL) of the main tank 201 is preferably 60 mL or more to 300 mL or less, and more preferably 100 mL or more to 250 mL or less. The initial volume of the ink filled in the main tank 201 is preferably up to about 95%, relative to the maximum volume of ink storage portion.

Also the sub tank 202 preferably has a large maximum volume of ink storage portion $V_2$ (mL), aiming at reducing the frequency of ink feed from the main tank 201, and at stabilizing the ink feed to the recording head 203. The maximum volume of ink storage portion $V_2$ (mL) of the sub tank 202 is, however, preferably not excessively large, presupposing that the sub tank 202 is mounted on the carriage 103 as illustrated in FIG. 1 to constitute the serial head system. That is, the sub tank 202 designed to store too much ink will upsize the recording unit 102, possibly slowing down the travel rate of the carriage 103, and raising the need for strengthening the endless belt 106 or a motor that moves the carriage 103. The maximum volume of ink storage portion volume $V_2$ (mL) of the sub tank 202 is, therefore, preferably 1 mL or more to 20 mL or less, and more preferably 2 mL or more to 10 mL or less.

Enclosures of the main tank 201 and the sub tank 202 are formed of a thermoplastic resin such as polyester, polycarbonate, polyethylene, polypropylene, polystyrene, polyphenylene ether, and mixtures or modified products thereof. The enclosure may have, arranged therein, an ink absorbent capable of generating a negative pressure for retaining the ink. The ink absorbent is preferably a compressed fabric of polypropylene, polyurethane and so forth. The ink may alternatively be reserved directly in the enclosure, without disposing the ink absorbent. From the viewpoint of enabling high-speed recording, the sub tank 202 preferably has arranged therein no absorbent that retains the ink in an impregnated manner, instead an enclosure composing the sub tank 202 directly reserves the ink.

The recording unit 102 includes the recording head 203 and the sub tank 202. Another possible mode may be such that the sub tank 202 is attached to the recording unit 102 which is a head cartridge with a built-in recording head 203, and the recording unit 102 thus having the sub tank 202 attached thereto may be mounted on the carriage 103. Alternatively again, the recording unit 102 integrally composed of the sub tank 202 and the recording head 203 may be mounted on the carriage 103. Above all, preferred is a mode in which, as illustrated in FIGS. 1 and 2, the recording unit 102 having the sub tank 202 attached thereto is set on the carriage 103.

Ink ejection system of the recording head 203 is exemplified by a system of applying mechanical energy to the ink, and a system of applying heat energy to the ink. Among them, the system of applying heat energy to the ink before ejection is preferred.

The recording medium on which images are recorded may be any of known ones. Among them, preferably used are permeable paper such as recording media including plain paper and non-coated paper, and recording media having a coating layer such as glossy paper and art paper.

<Aqueous Ink>

The ink jet recording method of the present invention includes, by using a plurality of aqueous inks that contain a cyan ink, a magenta ink and a yellow ink, applying the aqueous inks ejected through the ejection orifice of the recording head onto a recording medium to record an image. Each of the plurality of aqueous inks is a pigment ink that contains a pigment as a coloring material. Hereinafter, components of the ink and other aspects will be described.

[Coloring Material]

Pigment is used as the coloring material. Content (% by mass) of the pigment in the ink is preferably 0.1% by mass or more to 15.0% by mass or less relative to the total mass of the ink, and is more preferably 1.0% by mass or more to 10.0% by mass or less. Contents of the pigments in the inks preferably follow a decreasing order of the magenta ink, the yellow ink and the cyan ink, from the largest to the smallest.

Mode of dispersion of the pigment is not specifically limited. For example, employable are resin-dispersed pigment dispersed with a resin dispersant, surfactant-dispersed pigment, and a microcapsule pigment whose particle surface is at least partially covered with a resin or the like. In addition, also employable are self-dispersible pigment having a functional group that contains a hydrophilic group such as an anionic group bound on the particle surface of the pigment; and pigment having organic group that contains a polymer chemically bound to the particle surface of the pigment (resin-bound, self-dispersible pigment). Pigments based on different modes of dispersion may alternatively be used in a combined manner. Among them, the resin-dispersed pigment dispersed with a resin dispersant is preferred. The resin dispersant preferably employs a water-soluble resin.

The cyan ink contains a phthalocyanine pigment such as a copper phthalocyanine pigment. The phthalocyanine pigment is exemplified by C.I. Pigment Blue 15, 15:1, 15:3, 15:4 and 15:6. Among them, C.I. Pigment Blue 15:3 is preferred. These phthalocyanine pigments can be used singly or in combination of two or more kinds thereof.

Both of the yellow ink and the magenta ink individually contain an azo pigment. Azo pigment used for the yellow ink is exemplified by C.I. Pigment Yellow 1, 3, 12, 13, 14, 17, 55, 62, 65, 73, 74, 81, 83, 93, 97, 100, 104, 127, 151, 154, 155, 174, 180 and 183. Among them, C.I. Pigment Yellow 74 is preferred. These azo pigments can be used singly or in combination of two or more kinds thereof. Azo pigment used for the magenta ink is exemplified by C.I. Pigment Red 4, 9, 12, 14, 23, 31, 32, 49:1, 49:2, 57, 63:1, 112, 146, 147, 150, 170, 175, 176, 184, 185, 187, 188, 208, 210, 245, 268 and 269. Among them, C.I. Pigment Red 150 is preferred. These azo pigments can be used singly or in combination of two or more kinds thereof.

The magenta ink preferably contains a quinacridone pigment as an additional coloring material besides the azo pigment. The quinacridone pigment is exemplified by C.I. Pigment Red 122, 192, 202, 206, 207, 209 and 282; and C.I. Pigment Violet 19. The quinacridone pigment may be a quinacridone solid solution formed of two or more of these quinacridone pigments. Among them, a solid solution that contains C.I. Pigment Violet 19 and C.I. Pigment Red 122 is preferred. With the quinacridone pigment contained therein together with the azo pigment, the magenta ink can express more preferable color tone of magenta. Although the quinacridone pigment tends to aggregate as described above, coexistence with the azo pigment will more likely to suppress aggregation of the pigment, as compared with a magenta ink that contains the quinacridone pigment as an only pigment. Hence, the combined use with the quinacridone pigment will not degrade the effect of suppressing the aggregated pigment from adhering on the inner surface of the tube for the magenta ink, making it possible to express a better color tone expected to the magenta ink.

Content (% by mass) of the azo pigment in the magenta ink is preferably 20% by mass or more relative to the total content (% by mass) of all pigments in the magenta ink, and is more preferably 30% by mass or more. Too low percentage of the azo pigment would make the aggregated quinacridone pigment more likely to adhere to the inner surface of the tube for the magenta ink, and would degrade the level of suppressive effect on tone change of the tertiary color. Content (% by mass) of the azo pigment in the magenta ink is preferably 80% by mass or less relative to the total content (% by mass) of all pigments in the magenta ink, and is more preferably 70% by mass or less. Too high percentage of the azo pigment would make it slightly difficult to express a color tone expected to the magenta ink.

In a preferred mode, the cyan ink contains C.I. Pigment Blue 15:3, the magenta ink contains C.I. Pigment Red 150 and a quinacridone solid solution, and the yellow ink contains C.I. Pigment Yellow 74. Furthermore, the quinacridone solid solution in the magenta ink is particularly preferably a solid solution that contains C.I. Pigment Violet 19 and C.I. Pigment Red 122. With the pigments of the individual inks combined as described above, the aggregated pigment will be less likely to adhere to the inner surface of the tube for the magenta ink, making it possible to effectively suppress tone change of the tertiary color, and to suitably balance tones of the individual inks, which proves a large advantage.

[Resin]

The ink preferably contains a resin. The resin can be added to the ink, in order (i) to stabilize the state of dispersion of the pigment, that is, can be added as a resin dispersant or an auxiliary thereof. Furthermore, the resin can be added to the ink, in order (ii) to improve various characteristics of the image to be recorded. The resin may reside in the ink as dissolved in an aqueous medium, or in the form of particle dispersed in the aqueous medium. The phrase "the resin is water-soluble" in this patent specification means that the resin does not form a particle whose size is measurable by a method such as dynamic light scattering method, after being neutralized with an alkali equivalent to the acid value. Content (% by mass) of the resin in the ink is preferably 0.1% by mass or more to 5.0% by mass or less relative to the total mass of the ink, and is more preferably 0.1% by mass or more to 3.0% by mass or less.

The resin is exemplified by acrylic resin, polyester resin, urethane resin, urea resin, polysaccharide and polypeptide. Among them, acrylic resin is preferred considering discharge characteristic out through the ejection orifice of the recording head. The acrylic resin preferably contains, as the structural units thereof, a unit having anionic group, and a unit free of anionic group. Type of the acrylic resin may be any of random copolymer, block copolymer, graft copolymer and combinations thereof.

Monomers that can be polymerized to form a unit for composing the acrylic resin is exemplified by monomer having anionic group, and monomer free of anionic group. In most cases, the monomer having anionic group will give a hydrophilic unit after polymerized, and the monomer free of anionic group will give a hydrophobic unit after polymerized.

The monomer having an anionic group is exemplified by monomers having a carboxylic acid group such as (meth)acrylic acid, itaconic acid, maleic acid and fumaric acid; and anhydrides and salts of these monomers. Cation that composes the salt of the monomer having an anionic group is exemplified by lithium cation, sodium cation, potassium cation, ammonium cation and organoammonium cation.

The monomer free of anionic group is exemplified by monomers having an aromatic group such as styrene, α-methylstyrene, benzyl (meth)acrylate, 2-vinylpyridine, 4-vinylpyridine and 1-vinylimidazole; and (meth)acrylic esters such as ethyl (meth)acrylate, methyl (meth)acrylate, (iso)propyl (meth)acrylate, (n-, iso-, t-)butyl (meth)acrylate and 2-ethylhexyl (meth)acrylate.

The resin preferably has an acid value of 40 mgKOH/g or more to 300 mgKOH/g or less, which is preferably 100 mgKOH/g or more to 250 mgKOH/g or less. In particular, the acid value is particularly preferably 100 mgKOH/g or more to 200 mgKOH/g or less. The resin preferably has a weight average molecular weight of 3,000 or more to 50,000 or less, which is more preferably 5,000 or more to 15,000 or less. The weight average molecular weight of the resin is given by a polystyrene equivalent value measured by gel permeation chromatography.

[Random Copolymer]

The ink preferably contains a water-soluble random copolymer that contains a (meth)acrylic acid-derived unit, and a unit free of anionic group derived from at least either a monomer having an aromatic group or a (meth)acrylic ester. In particular, preferred is a water-soluble random copolymer that contains a (meth)acrylic acid-derived unit, and a unit derived from at least a monomer of either styrene or α-methylstyrene. Such random copolymer is suitable as a resin dispersant for dispersing the pigment, since it is highly interactive with the pigment. The random copolymer preferably has an acid value of 100 mgKOH/g or more to 250 mgKOH/g or less, which is more preferably 100 mgKOH/g or more to 200 mgKOH/g or less. Content (% by mass) of the random copolymer in the ink is preferably 0.1% by mass or more to 3.0% by mass or less, relative to the total mass of the ink.

[Block Copolymer]

The ink preferably contains an additional block copolymer. In particular, the magenta ink preferably contains the block copolymer. The block copolymer is preferably a water-soluble resin that contains A-block free of anionic group, and B-block having an anionic group. The A-block (hydrophobic block) is a polymer block composed of units derived from a monomer free of anionic group. On the other hand, the B-block (hydrophilic block) is a polymer block composed of units derived from a monomer having an anionic group. Each block may be composed of units derived from one kind or two or more kinds of monomers, and in particular, preferably composed only of units derived from one kind of monomer.

The block copolymer is preferably a water-soluble resin that contains the A-block (hydrophobic block) and the B-block (hydrophilic block) shown below. The A-block is preferably composed of a unit derived from a monomer having an aromatic group such as benzyl methacrylate. The B-block preferably contains a unit derived from a (meth)acrylic ester such as butyl methacrylate, and a unit derived from a monomer having an anionic group such as (meth)acrylic acid. Such block copolymer, having separate functions localized to the intramolecular sites, can efficiently adsorb on the pigment and the resin dispersant therefor, and can exert a steric repulsive force over a long duration, making it possible to stably maintain the state of dispersion of the pigment. Hence, the aggregated pigment becomes less likely to adhere to the inner surface of the tube, and this makes it possible to more effectively suppress tone change of the tertiary color. The block copolymer preferably has an acid value of 80 mgKOH/g or more to 200 mgKOH/g or less, which is more preferably 100 mgKOH/g or more to 150 mgKOH/g or less. The block copolymer may be synthesized according to any of known polymerization methods having been usually employed. The polymerization method is specifically exemplified by living radical polymerization, living anion polymerization and so forth. Content (% by mass) of the block copolymer in the ink is preferably 0.1% by mass or more to 3.0% by mass or less, relative to the total mass of the ink.

Assuming now that each of the plurality of inks contains a resin. In this case, the mass ratio of the content (% by mass) of the resin relative to the total content (% by mass) of all pigments in the magenta ink is preferably more than the mass ratio of the content (% by mass) of the resin relative to the total content (% by mass) of all pigments in the cyan ink. Furthermore, the mass ratio of the content (% by mass) of the resin relative to the total content (% by mass) of all pigments in the magenta ink is preferably more than the mass ratio of the content (% by mass) of the resin relative to the total content (% by mass) of all pigments in the yellow ink. With such relationships among these three types of inks satisfied, the aggregated pigment becomes less likely to adhere on the inner surface of the tube for the magenta ink, making it possible to more effectively suppress tone change of the tertiary color.

(Aqueous Medium)

The ink is an aqueous ink that contains at least water as the aqueous medium. The ink may contain water, or an aqueous medium which is a mixed solvent of water and a water-soluble organic solvent. The water-soluble organic solvent employable here may be any of those applicable to the ink for ink jet use, such as alcohols, (poly)alkylene glycols, glycol ethers, nitrogen-containing compounds and sulfur-containing compounds. Content (% by mass) of the water-soluble organic solvent in the ink is preferably 3.0% by mass or more to 50.0% by mass or less, relative to the total mass of the ink. The water is preferably deionized water or ion-exchanged water. Content (% by mass) of water in the ink is preferably 50.0% by mass or more to 95.0% by mass or less, relative to the total mass of the ink.

[Surfactant]

The ink may contain surfactants of various types. The surfactant is exemplified by hydrocarbonaceous surfactant, fluorochemical surfactant and silicone-based surfactant. These surfactants may be freely selectable from nonionic surfactant, anionic surfactant, cationic surfactant and amphoteric surfactant. Content (% by mass) of the surfactant in the ink is preferably 0.1% by mass or more to 5.0% by mass or less relative to the total mass of the ink, and more preferably 0.2% by mass or more to 1.5% by mass or less.

[Other Components]

The ink may further contain a water-soluble organic compound that exists as solid at 25° C., such as urea or derivative thereof, trimethylolpropane and trimethylolethane. Content (% by mass) of the water-soluble organic solvent in the ink is preferably 0.1% by mass or more to 10.0% by mass or less, relative to the total mass of the ink. Besides the aforementioned components, the ink may optionally contain various additives such as antifoaming agent, pH adjusting agent, viscosity modifier, rust inhibitor, antiseptic, antifungal agent, antioxidant and reduction inhibitor.

EXAMPLES

The present invention will further be detailed below, referring to Examples and Comparative Examples. The present invention is, however, by no means limited to these Examples, without departing from the spirit thereof. All descriptions regarding amount of components given in "part(s)" or "%" are on the mass basis unless otherwise specifically noted. The acid value of the resin was measured by potentiometric titration by using a potassium hydroxide-methanol titrant. The weight average molecular weight of the resin is a polystyrene equivalent value measured by gel permeation chromatography (GPC).

<Preparation of Resins>

(Resins 1 to 4)

Water-soluble resins 1 to 4 were synthesized by polymerizing the monomers listed in Table 1, according to a usual method. Each of resins 1 to 4 were found to have an acid value of 120 mgKOH/g, and a weight average molecular weight of 8,000. Each of the thus obtained resins was dissolved in ion-exchanged water, while adding thereto potassium hydroxide in amounts equimolar to the acid value of the obtained resin 1 to 4, to prepare an aqueous solution of each resin having a resin content of 10.0%. The monomers in Table 1 are represented by St: styrene, BzMA: benzyl methacrylate, nBA: n-butyl acrylate, AA: acrylic acid and MAA: methacrylic acid.

TABLE 1

Synthetic Conditions of Resins 1 to 4

| Resin | St | BzMA | nBA | AA | MAA |
|---|---|---|---|---|---|
| 1 | 84.6 | | | 15.4 | |
| 2 | | 84.6 | | 15.4 | |
| 3 | | | 84.6 | 15.4 | |
| 4 | 81.6 | | | | 18.4 |

(Resin 5)

Resin 5, which is a water-soluble block copolymer, was synthesized according to the description of Japanese Patent Application Laid-Open No. 2018-150518. Resin 5 has the A-block composed of benzyl methacrylate-derived unit, and the B-block composed of butyl methacrylate-derived unit and methacrylic acid-derived unit. Resin 5 was found to have an acid value of 120 mgKOH/g, and a weight average molecular weight of 10,000. The thus obtained resin 5 was dissolved in ion-exchanged water, while adding thereto potassium hydroxide in amounts equimolar to the acid value, to prepare aqueous solution of resin 5 with a content of resin 5 of 10.0%.

<Preparation of Pigment Dispersion Liquid>

The components (in parts) listed on the upper rows of Table 2 were mixed to obtain each mixture. In Table 2, "Solid solution pigment" refers to a solid solution that contains C.I. Pigment Violet 19 and C.I. Pigment Red 122. Each mixture obtained by using a sand grinder was allowed to disperse for one hour, and then centrifuged to remove coarse particles. The mixture was filtered under pressure through a microfilter (from FUJIFILM Corporation) with a pore size of 3.0 μm, and an appropriate amount of ion-exchanged water was added to obtain each pigment dispersion liquid. Lower rows of Table 2 summarize contents of pigment and resin (resin dispersant) in each pigment dispersion liquid.

TABLE 2

Compositions and Properties of Pigment Dispersion

| | Pigment dispersion liquid | | | | | | | |
|---|---|---|---|---|---|---|---|---|
| | 1 | 2 | 3 | 4 | 5 | 6 | 7 | 8 |
| C.I. Pigment Blue 15:3 | 10.0 | | | | | | | |
| C.I. Pigment Blue 15:4 | | 10.0 | | | | | | |
| C.I. Pigment Red 150 | | | 10.0 | | | | | |
| Solid solution pigment | | | | 10.0 | | | | |
| C.I. Pigment Red 122 | | | | | 10.0 | | | |
| C.I. Pigment Violet 19 | | | | | | 10.0 | | |
| C.I. Pigment Yellow 74 | | | | | | | 10.0 | |
| C.I. Pigment Yellow 155 | | | | | | | | 10.0 |
| Aqueous solution of resin 1 | 50.0 | 50.0 | 50.0 | 50.0 | 50.0 | 50.0 | 50.0 | 50.0 |
| Ion-exchanged water | 40.0 | 40.0 | 40.0 | 40.0 | 40.0 | 40.0 | 40.0 | 40.0 |
| Content of pigment (%) | 10.0 | 10.0 | 10.0 | 10.0 | 10.0 | 10.0 | 10.0 | 10.0 |
| Content of resin (%) | 4.0 | 4.0 | 4.0 | 4.0 | 4.0 | 4.0 | 4.0 | 4.0 |

<Preparation of Ink>

The individual components (in %) listed in the upper rows of Tables 3-1 to 3-3 were mixed, thoroughly stirred, and filtered under pressure through a microfilter (from FUJIFILM Corporation) with a pore size of 3.0 μm, to thereby prepare each ink. In Tables 3-1 to 3-3, the number average molecular weight of polyethylene glycol is "1,000". "Acetylenol E100" is a trade name of a nonionic surfactant (ethylene oxide adduct of acetylene glycol) manufactured by Kawaken Fine Chemicals Co., Ltd. Properties of the prepared inks are summarized on the lower rows of Tables 3-1 to 3-3.

TABLE 3-1

Composition and Properties of Ink

| | Cyan ink | | | | | | |
|---|---|---|---|---|---|---|---|
| | C1 | C2 | C3 | C4 | C5 | C6 | C7 |
| Pigment dispersion liquid 1 | 35.0 | 35.0 | 35.0 | 35.0 | | 35.0 | |
| Pigment dispersion liquid 2 | | | | | 35.0 | | |
| C.I. Direct Blue 199 | | | | | | | 3.5 |
| Glycerin | 14.0 | 14.0 | 14.0 | 14.0 | 14.0 | 14.0 | 14.0 |
| Triethylene glycol | 7.0 | 7.0 | 7.0 | 7.0 | 7.0 | 7.0 | 7.0 |
| Polyethylene glycol | 1.0 | 1.0 | 1.0 | 1.0 | 1.0 | 1.0 | 1.0 |
| 1,2-Hexanediol | 1.0 | 1.0 | 1.0 | 1.0 | 1.0 | 1.0 | 1.0 |
| 1,6-Hexanediol | 3.0 | 3.0 | 3.0 | 3.0 | 3.0 | 3.0 | 3.0 |
| Aqueous solution of resin 1 | 5.0 | | | | 5.0 | 15.0 | |
| Aqueous solution of resin 2 | | 5.0 | | | | | |
| Aqueous solution of resin 3 | | | 5.0 | | | | |
| Aqueous solution of resin 4 | | | | 5.0 | | | |
| Aqueous solution of resin 5 | | | | | | | |
| Acetylenol E100 | 0.5 | 0.5 | 0.5 | 0.5 | 0.5 | 0.5 | 0.5 |
| Ion-exchanged water | 33.5 | 33.5 | 33.5 | 33.5 | 33.5 | 23.5 | 70.0 |
| Content P of pigment (%) | 3.5 | 3.5 | 3.5 | 3.5 | 3.5 | 3.5 | 0.0 |
| Content PA of azo pigment (%) | 0.0 | 0.0 | 0.0 | 0.0 | 0.0 | 0.0 | 0.0 |
| (PA/P)*100 (%) | 0 | 0 | 0 | 0 | 0 | 0 | — |
| Content R of resin (%) | 1.9 | 1.9 | 1.9 | 1.9 | 1.9 | 2.9 | 0.0 |
| R/P (times) | 0.5 | 0.5 | 0.5 | 0.5 | 0.5 | 0.8 | — |

TABLE 3-2

Composition and Properties of Ink

| | Magenta ink | | | | | | | | | | |
|---|---|---|---|---|---|---|---|---|---|---|---|
| | M1 | M2 | M3 | M4 | M5 | M6 | M7 | M8 | M9 | M10 | M11 |
| Pigment dispersion liquid 3 | 30.0 | 30.0 | 30.0 | 30.0 | 30.0 | 30.0 | 50.0 | 5.0 | 10.0 | 40.0 | 45.0 |
| Pigment dispersion liquid 4 | 20.0 | 20.0 | 20.0 | 20.0 | | | | 45.0 | 40.0 | 10.0 | 5.0 |
| Pigment dispersion liquid 5 | | | | | 20.0 | | | | | | |
| Pigment dispersion liquid 6 | | | | | | 20.0 | | | | | |
| C.I. Acid Red 249 | | | | | | | | | | | |
| Glycerin | 14.0 | 14.0 | 14.0 | 14.0 | 14.0 | 14.0 | 14.0 | 14.0 | 14.0 | 14.0 | 14.0 |
| Triethylene glycol | 7.0 | 7.0 | 7.0 | 7.0 | 7.0 | 7.0 | 7.0 | 7.0 | 7.0 | 7.0 | 7.0 |
| Polyethylene glycol | 1.0 | 1.0 | 1.0 | 1.0 | 1.0 | 1.0 | 1.0 | 1.0 | 1.0 | 1.0 | 1.0 |
| 1,2-Hexanediol | 1.0 | 1.0 | 1.0 | 1.0 | 1.0 | 1.0 | 1.0 | 1.0 | 1.0 | 1.0 | 1.0 |
| 1,6-Hexanediol | 3.0 | 3.0 | 3.0 | 3.0 | 3.0 | 3.0 | 3.0 | 3.0 | 3.0 | 3.0 | 3.0 |
| Aqueous solution of resin 1 | 6.0 | | | | 6.0 | 6.0 | 6.0 | 6.0 | 6.0 | 6.0 | 6.0 |
| Aqueous solution of resin 2 | | 6.0 | | | | | | | | | |
| Aqueous solution of resin 3 | | | 6.0 | | | | | | | | |
| Aqueous solution of resin 4 | | | | 6.0 | | | | | | | |
| Aqueous solution of resin 5 | 2.0 | 2.0 | 2.0 | 2.0 | 2.0 | 2.0 | 2.0 | 2.0 | 2.0 | 2.0 | 2.0 |
| Acetylenol E100 | 0.5 | 0.5 | 0.5 | 0.5 | 0.5 | 0.5 | 0.5 | 0.5 | 0.5 | 0.5 | 0.5 |
| Ion-exchanged water | 15.5 | 15.5 | 15.5 | 15.5 | 15.5 | 15.5 | 15.5 | 15.5 | 15.5 | 15.5 | 15.5 |
| Content P of pigment (%) | 5.0 | 5.0 | 5.0 | 5.0 | 5.0 | 5.0 | 5.0 | 5.0 | 5.0 | 5.0 | 5.0 |
| Content PA of azo pigment (%) | 3.0 | 3.0 | 3.0 | 3.0 | 3.0 | 3.0 | 5.0 | 0.5 | 1.0 | 4.0 | 4.5 |
| (PA/P)*100 (%) | 60 | 60 | 60 | 60 | 60 | 60 | 100 | 10 | 20 | 80 | 90 |
| Content R of resin (%) | 2.8 | 2.8 | 2.8 | 2.8 | 2.8 | 2.8 | 2.8 | 2.8 | 2.8 | 2.8 | 2.8 |
| R/P (times) | 0.6 | 0.6 | 0.6 | 0.6 | 0.6 | 0.6 | 0.6 | 0.6 | 0.6 | 0.6 | 0.6 |

| | Magenta ink | | | | | | | | |
|---|---|---|---|---|---|---|---|---|---|
| | M12 | M13 | M14 | M15 | M16 | M17 | M18 | M19 | M20 | M21 |
| Pigment dispersion liquid 3 | 30.0 | 30.0 | 30.0 | 5.0 | 45.0 | 50.0 | | | | |
| Pigment dispersion liquid 4 | 20.0 | 20.0 | 20.0 | 45.0 | 5.0 | | 50.0 | | | |
| Pigment dispersion liquid 5 | | | | | | | | | 50.0 | |
| Pigment dispersion liquid 6 | | | | | | | | | | 50.0 |
| C.I. Acid Red 249 | | | | | | | | | | 3.5 |

TABLE 3-2-continued

| Composition and Properties of Ink | | | | | | | | | | |
|---|---|---|---|---|---|---|---|---|---|---|
| Glycerin | 14.0 | 14.0 | 14.0 | 14.0 | 14.0 | 14.0 | 14.0 | 14.0 | 14.0 | 14.0 |
| Triethylene glycol | 7.0 | 7.0 | 7.0 | 7.0 | 7.0 | 7.0 | 7.0 | 7.0 | 7.0 | 7.0 |
| Polyethylene glycol | 1.0 | 1.0 | 1.0 | 1.0 | 1.0 | 1.0 | 1.0 | 1.0 | 1.0 | 1.0 |
| 1,2-Hexanediol | 1.0 | 1.0 | 1.0 | 1.0 | 1.0 | 1.0 | 1.0 | 1.0 | 1.0 | 1.0 |
| 1,6-Hexanediol | 3.0 | 3.0 | 3.0 | 3.0 | 3.0 | 3.0 | 3.0 | 3.0 | 3.0 | 3.0 |
| Aqueous solution of resin 1 | 4.0 | 8.0 | 6.0 | 6.0 | 6.0 | 6.0 | 6.0 | 6.0 | 6.0 | |
| Aqueous solution of resin 2 | | | | | | | | | | |
| Aqueous solution of resin 3 | | | | | | | | | | |
| Aqueous solution of resin 4 | | | | | | | | | | |
| Aqueous solution of resin 5 | 2.0 | | | | | | 2.0 | 2.0 | 2.0 | |
| Acetylenol E100 | 0.5 | 0.5 | 0.5 | 0.5 | 0.5 | 0.5 | 0.5 | 0.5 | 0.5 | 0.5 |
| Ion-exchanged water | 17.5 | 15.5 | 17.5 | 17.5 | 17.5 | 17.5 | 15.5 | 15.5 | 15.5 | 70.0 |
| Content P of pigment (%) | 5.0 | 5.0 | 5.0 | 5.0 | 5.0 | 5.0 | 5.0 | 5.0 | 5.0 | 0.0 |
| Content PA of azo pigment (%) | 3.0 | 3.0 | 3.0 | 0.5 | 4.5 | 5.0 | 0.0 | 0.0 | 0.0 | 0.0 |
| (PA/P)*100 (%) | 60 | 60 | 60 | 10 | 90 | 100 | 0 | 0 | 0 | — |
| Content R of resin (%) | 2.6 | 2.8 | 2.6 | 2.6 | 2.6 | 2.6 | 2.8 | 2.8 | 2.8 | 0.0 |
| R/P (times) | 0.5 | 0.6 | 0.5 | 0.5 | 0.5 | 0.5 | 0.6 | 0.6 | 0.6 | — |

TABLE 3-3

| Composition and Properties of Ink | | | | |
|---|---|---|---|---|
| | Yellow ink | | | |
| | Y1 | Y2 | Y3 | Y4 |
| Pigment dispersion liquid 7 | 45.0 | | 45.0 | |
| Pigment dispersion liquid 8 | | 45.0 | | |
| C.I. Direct Yellow 132 | | | | 3.5 |
| Glycerin | 14.0 | 14.0 | 14.0 | 14.0 |
| Triethylene glycol | 7.0 | 7.0 | 7.0 | 7.0 |
| Polyethylene glycol | 1.0 | 1.0 | 1.0 | 1.0 |
| 1,2-Hexanediol | 1.0 | 1.0 | 1.0 | 1.0 |
| 1,6-Hexanediol | 3.0 | 3.0 | 3.0 | 3.0 |
| Aqueous solution of resin 1 | | | 8.0 | |
| Aqueous solution of resin 2 | | | | |
| Aqueous solution of resin 3 | | | | |
| Aqueous solution of resin 4 | | | | |
| Aqueous solution of resin 5 | 4.0 | 4.0 | 4.0 | |
| Acetylenol E100 | 0.5 | 0.5 | 0.5 | 0.5 |
| Ion-exchanged water | 24.5 | 24.5 | 16.5 | 70.0 |
| Content P of pigment (%) | 4.5 | 4.5 | 4.5 | 0.0 |
| Content PA of azo pigment (%) | 4.5 | 4.5 | 4.5 | 0.0 |
| (PA/P)*100 (%) | 100 | 100 | 100 | — |
| Content R of resin (%) | 2.2 | 2.2 | 3.0 | 0.0 |
| R/P (times) | 0.5 | 0.5 | 0.7 | — |

<Preparation of Tube>

Tubes 1 to 5 formed by using a styrene-based thermoplastic elastomer, a lubricant and a softener, each having an inner diameter of 2 mm and an outer diameter of 4 mm, were prepared. Also tube 6 which is a commercially available glass tube, and tube 7 which is a commercially available aluminum tube, were prepared. The volume of air permeation of tubes 1 to 5 was measured by the above-described method in an environment of 40° C. The volume of air permeation of the tube is given by the volume per 100 mm length of the tube, expressed in "µL/day". Properties of the prepared tubes are summarized in Table 4.

TABLE 4

| Property of Tube | | |
|---|---|---|
| Tube | Material | Volume of air permeation (µL/day) |
| 1 | Resin | 30 |
| 2 | Resin | 7 |
| 3 | Resin | 10 |
| 4 | Resin | 60 |
| 5 | Resin | 70 |
| 6 | Glass | — |
| 7 | Aluminum | — |

<Evaluation>

An ink jet recording apparatus whose main part is structured as illustrated in FIG. 1, with the ink supplying system structured as illustrated in FIG. 2 incorporated therein, was prepared. The recording apparatus is a serial type recording apparatus in which the recording unit 102, with the recording head 203 incorporated therein and with the sub tank 202 attached thereto, is mounted on the carriage 103. Further, tubes of the types summarized in Table 5 were used as the ink supply tube 104. The maximum volume of ink storage portion $V_1$ of the main tank was set to 150 mL, and the maximum volume of ink storage portion $V_2$ of the sub tank was set to 5 mL. The main tank 201 was filled with the inks of the individual colors of the individual types combined as summarized in Table 5. In a case where the residual amount of the ink decreased during evaluation, the ink was filled through the inlet port of the main tank 201. In this embodiment, 100% recording duty is defined when a solid image is recorded under a condition that two ink droplets each weighing 5 ng are applied to a 1/600 inch×1/600 inch unit area. In the present invention, "AAA", "AA", "A" and "B" from among the evaluation criteria explained below were regarded as acceptable levels, whereas "C" was regarded as an unacceptable level. Results of evaluation are summarized in Table 5.

(Tone Change of Tertiary Color)

By using the aforementioned ink jet recording apparatus, the yellow ink, the cyan ink and the magenta ink were cumulatively applied in this order to the recording medium, to record an image of tertiary colors with a recording duty of each ink of 30%, and with a total recording duty of 90%. The recording medium employed was plain paper under the trade name of "HR-101" (from Canon Inc.). The obtained image was named "evaluation image 1". Next, a solid image explained below was recorded successively on 10 sheets, followed by one-hour interruption of recording, and this cycle was repeated to record the image on 5,000 sheets. The recorded solid image has the yellow ink, the cyan ink and the magenta ink applied in this order over the entire surface of the A4 size recording medium, with a recording duty of each ink of 5%, and a total recording duty of 15%. The recording medium employed was plain paper under the trade name of "GF-500" (from Canon Inc.). Thereafter, a tertiary color image was recorded under the same conditions as for the evaluation image 1. The obtained image was named "evaluation image 2".

The thus obtained tertiary color images named evaluation images 1 and 2 were measured by using a fluorescence spectrodensitometer (trade name "FD-7", from Konica Minolta, Inc.), to determine L*, a* and b* in the L*a*b* color space specified by CIE (International Commission on Illumination). Values measured on evaluation image 1 were denoted as $L_1^*$, $a_1^*$ and $b_1^*$, and values measured on evaluation image 2 were denoted as $L_2^*$, $a_2^*$ and $b_2^*$. Color difference ΔE was calculated from the individual measured values according to the formula of $\Delta E=\{(L_2^*-L_1^*)^2+(a_2^*-a_1^*)^2+(b_2^*-b_1^*)^2\}^{1/2}$, and the tone change of the tertiary color was evaluated according to the following evaluation criteria. Smaller ΔE indicates that the tone change is suppressed more effectively.

In this evaluation, the ink was consumed abundantly, and the large number of recording sheets were employed to cover a long duration elapsed from the start of evaluation. That is, the condition was adjusted so as to readily increase viscosity of the ink contained in the main tank, by increasing the number of times of replenishment of the ink through the inlet port into the main tank, and by elongating the time the ink is brought into contact with the air during replenishment. In addition, the condition was adjusted so that the volume of air permeation into the tube can readily increase, as a result of long duration of evaluation.

AAA: ΔE found to be less than 0.5.
AA: ΔE found to be 0.5 or more to less than 1.0.
A: ΔE found to be 1.0 or more to less than 1.5.
B: ΔE found to be 1.5 or more to less than 2.0.
C: ΔE found to be 2.0 or more.

(Color Tone of Magenta)

A solid image of 100% recording duty was recorded on an A4 size recording medium, by using the aforementioned ink jet recording apparatus through all nozzles for the magenta ink. The recording medium employed was plain paper under the trade name of "Red Label Superior" (from Canon Inc.). The b* value of the recorded image was measured using a colorimeter (Trade name "FD-7", manufactured by Konica Minolta, Inc.), and the color tone of magenta was evaluated according to the following evaluation criteria.

AA: b* value found to be −5 or less.
A: b* value found to be more than −5 to −3 or less.
B: b* value found to be more than −3 to 1 or less.
C: b* value found to be more than 1.

TABLE 5

Conditions for Evaluation and Results of Evaluation

| | | | | | | | Results of Evaluation | |
|---|---|---|---|---|---|---|---|---|
| | | Conditions for Evaluation | | | | | Tone | |
| | | Cyan ink | Magenta ink | Yellow ink | Ink inlet port | Tube | change of tertiary color | Color Tone of magenta |
| Example | 1 | C1 | M1 | Y1 | Yes | 1 | AAA | AA |
| | 2 | C1 | M1 | Y1 | Yes | 2 | AAA | AA |
| | 3 | C1 | M1 | Y1 | Yes | 3 | AAA | AA |
| | 4 | C1 | M1 | Y1 | Yes | 4 | AAA | AA |
| | 5 | C1 | M1 | Y1 | Yes | 5 | AA | AA |
| | 6 | C2 | M2 | Y1 | Yes | 1 | AAA | AA |
| | 7 | C3 | M3 | Y1 | Yes | 1 | AAA | AA |
| | 8 | C4 | M4 | Y1 | Yes | 1 | AAA | AA |
| | 9 | C5 | M1 | Y1 | Yes | 1 | AAA | AA |
| | 10 | C1 | M1 | Y2 | Yes | 1 | AAA | AA |
| | 11 | C1 | M5 | Y1 | Yes | 1 | AAA | AA |
| | 12 | C1 | M6 | Y1 | Yes | 1 | AAA | AA |
| | 13 | C1 | M7 | Y1 | Yes | 1 | AAA | A |
| | 14 | C1 | M8 | Y1 | Yes | 1 | AA | AA |
| | 15 | C1 | M9 | Y1 | Yes | 1 | AAA | AA |
| | 16 | C1 | M10 | Y1 | Yes | 1 | AAA | AA |
| | 17 | C1 | M11 | Y1 | Yes | 1 | AAA | A |
| | 18 | C1 | M12 | Y1 | Yes | 1 | AA | AA |
| | 19 | C6 | M1 | Y3 | Yes | 1 | AA | AA |
| | 20 | C1 | M13 | Y1 | Yes | 1 | AA | AA |
| | 21 | C6 | M14 | Y3 | Yes | 1 | A | AA |
| | 22 | C6 | M15 | Y3 | Yes | 1 | B | AA |
| | 23 | C6 | M16 | Y3 | Yes | 1 | A | A |
| | 24 | C6 | M17 | Y3 | Yes | 1 | A | B |
| | 25 | C6 | M17 | Y3 | Yes | 5 | B | B |
| Comparative Example | 1 | C1 | M18 | Y1 | Yes | 1 | C | AA |
| | 2 | C1 | M19 | Y1 | Yes | 1 | C | AA |
| | 3 | C1 | M20 | Y1 | Yes | 1 | C | AA |
| Reference Example | 1 | C1 | M1 | Y1 | Yes | — | AAA | AA |
| | 2 | C1 | M5 | Y1 | Yes | — | AAA | AA |
| | 3 | C1 | M18 | Y1 | Yes | — | AAA | AA |
| | 4 | C1 | M19 | Y1 | Yes | — | AAA | AA |
| | 5 | C1 | M1 | Y1 | Yes | 6 | AAA | AA |
| | 6 | C1 | M1 | Y1 | Yes | 7 | AAA | AA |
| | 7 | C1 | M1 | Y1 | No | 1 | AAA | AA |
| | 8 | C1 | M18 | Y1 | No | 1 | AAA | AA |
| | 9 | C1 | M19 | Y1 | No | 1 | AAA | AA |
| | 10 | C7 | M21 | Y4 | Yes | 1 | AAA | AA |

Comparative Examples that demonstrated large ΔE in the evaluation of "Tone change of tertiary color" were found to cause green shift of the color tone, which was more in evaluation image 2 than in evaluation image 1. This can be understood that Examples with small ΔE were successfully suppressed from causing decrease of the ejection volume of the magenta ink due to clogging of the tube.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-125238, filed Jul. 22, 2020, and Japanese Patent Application No. 2021-103218, filed Jun. 22, 2021, which are hereby incorporated by reference herein in their entirety.

What is claimed is:

1. An ink jet recording method with use of an ink jet recording apparatus that includes a plurality of aqueous inks comprising a cyan ink, a magenta ink, and a yellow ink; an ink storage portion that independently stores the plurality of aqueous inks; a recording head having formed therein an ejection orifice through which each aqueous ink of the plurality of aqueous inks supplied from the ink storage portion is ejected; and a tube through which each aqueous ink of the plurality of aqueous inks is supplied from the ink storage portion to the recording head, and the method comprising:
applying each aqueous ink of the plurality of aqueous inks ejected through the ejection orifice onto a recording medium to record an image,
wherein the ink storage portion has provided thereto an inlet port through which each aqueous ink of the plurality of aqueous inks is filled,
wherein the tube is formed of a resin material,
wherein the cyan ink comprises a phthalocyanine pigment,
wherein both of the yellow ink and the magenta ink individually comprises an azo pigment,
wherein a mass ratio of a content (% by mass) of a resin to a total content (% by mass) of all the pigments in the magenta ink is more than both of (i) a mass ratio of a content (% by mass) of a resin to a total content (% by mass) of all the pigments in the cyan ink, and (ii) a mass ratio of a content (% by mass) of a resin to a total content (% by mass) of all the pigments in the yellow ink, and
wherein the contents of the pigments in the inks follow a decreasing order of the magenta ink, the yellow ink, and the cyan ink, from the largest to the smallest.

2. The ink jet recording method according to claim 1, wherein a volume of air permeation (μL/day) of the tube at a temperature of 40° C. is 60 μL/day or less.

3. The ink jet recording method according to claim 1, wherein the magenta ink further comprises a quinacridone pigment.

4. The ink jet recording method according to claim 3, wherein a content (% by mass) of the azo pigment in the magenta ink is 20% by mass or more, relative to a total content (% by mass) of all the pigments in the magenta ink.

5. The ink jet recording method according to claim 3, wherein a content (% by mass) of the azo pigment in the magenta ink is 80% by mass or less, relative to a total content (% by mass) of all the pigments in the magenta ink.

6. The ink jet recording method according to claim 1, wherein the magenta ink further comprises a block copolymer.

7. The ink jet recording method according to claim 6, wherein the block copolymer is a water-soluble resin that contains (a) an A-block (hydrophobic block) composed of a unit derived from a monomer having an aromatic group and (b) a B-block (hydrophilic block) containing a unit derived from a (meth)acrylic ester, and a unit derived from a monomer having an anionic group.

8. The ink jet recording method according to claim 1, wherein the resin material composing the tube is a styrene-based thermoplastic elastomer.

9. The ink jet recording method according to claim 1, wherein the inner diameter of the tube is 1 mm or more to 5 mm or less.

10. The ink jet recording method according to claim 1, wherein the thickness of the tube is 0.5 mm or more to 5 mm or less.

11. The ink jet recording method according to claim 1, wherein a volume of air permeation (μL/day) of the tube at a temperature of 40° C. is 10 μL/day or more.

12. The ink jet recording method according to claim 1, wherein the ink storage portion comprises a first ink storage portion and a second ink storage portion, and the maximum volume of the first ink storage portion $V_1$ (mL) is 60 mL or more to 300 mL or less.

13. The ink jet recording method according to claim 1, wherein the ink storage portion comprises a first ink storage portion and a second ink storage portion, and the maximum volume of the second ink storage portion $V_2$ (mL) is 1 mL or more to 20 mL or less.

14. The ink jet recording method according to claim 1, wherein the cyan ink comprises C.I. Pigment Blue 15:3, the yellow ink comprises C.I. Pigment Yellow 74, and the magenta ink comprises C.I. Pigment Red 150.

15. The ink jet recording method according to claim 1, wherein the magenta ink comprises a solid solution that contains C.I. Pigment Violet 19 and C.I. Pigment Red 122.

16. An ink jet recording apparatus comprising:
a plurality of aqueous inks including a cyan ink, a magenta ink, and a yellow ink;
an ink storage portion that independently stores the plurality of aqueous inks;
a recording head having formed therein an ejection orifice through which each aqueous ink of the plurality of aqueous inks supplied from the ink storage portion is ejected; and
a tube through which each aqueous ink of the plurality of aqueous inks is supplied from the ink storage portion to the recording head,
wherein the ink storage portion has provided thereto an inlet port through which each aqueous ink of the plurality of aqueous inks is filled,
wherein the tube is formed of a resin material,
wherein the cyan ink comprises a phthalocyanine pigment,
wherein the yellow ink and the magenta ink individually comprises an azo pigment,
wherein a mass ratio of a content (% by mass) of a resin to a total content (% by mass) of all the pigments in the magenta ink is more than both of (i) a mass ratio of a content (% by mass) of a resin to a total content (% by mass) of all the pigments in the cyan ink, and (ii) a mass ratio of a content (% by mass) of a resin to a total content (% by mass) of all the pigments in the yellow ink, and
wherein the contents of the pigments in the inks follow a decreasing order of the magenta ink, the yellow ink, and the cyan ink, from the largest to the smallest.

* * * * *